United States Patent
Chiueh et al.

(10) Patent No.: US 10,063,067 B2
(45) Date of Patent: Aug. 28, 2018

(54) BATTERY SYSTEM AND CONTROL METHOD THEREOF

(71) Applicant: INDUSTRIAL TECHNOLOGY RESEARCH INSTITUTE, Hsinchu (TW)

(72) Inventors: Tzi-Cker Chiueh, Taipei (TW); Shih-Hao Liang, New Taipei (TW); Kai-Cheung Juang, Hsinchu (TW); Shou-Hung Ling, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 241 days.

(21) Appl. No.: 14/976,617

(22) Filed: Dec. 21, 2015

(65) Prior Publication Data
US 2017/0133865 A1    May 11, 2017

(30) Foreign Application Priority Data
Nov. 9, 2015  (TW) .............................. 104136913 A

(51) Int. Cl.
*H02J 7/00* (2006.01)
*H02J 7/14* (2006.01)

(52) U.S. Cl.
CPC .......... *H02J 7/0016* (2013.01); *H02J 7/0019* (2013.01); *H02J 7/0021* (2013.01); *H02J 7/0068* (2013.01); *H02J 7/0014* (2013.01); *H02J 7/0052* (2013.01); *H02J 7/0065* (2013.01)

(58) Field of Classification Search
USPC ........ 320/112, 113, 114, 115, 116, 107, 136, 320/103, 132, 149, 157, 160, 119
See application file for complete search history.

(56) References Cited

U.S. PATENT DOCUMENTS

| | | |
|---|---|---|
| 7,456,521 B2 | 11/2008 | Weidenheimer et al. |
| 7,948,211 B2 | 5/2011 | Gonzales et al. |
| 8,269,455 B2 | 9/2012 | Marten |
| 8,427,106 B2 | 4/2013 | Kim et al. |

(Continued)

FOREIGN PATENT DOCUMENTS

| | | |
|---|---|---|
| CN | 101232193 A | 7/2008 |
| CN | 102918742 A | 2/2013 |

(Continued)

OTHER PUBLICATIONS

U.S. Appl. No. 14/583,266.

(Continued)

*Primary Examiner* — Alexis Pacheco
(74) *Attorney, Agent, or Firm* — Rabin & Berdo, P.C.

(57) ABSTRACT

A battery system includes a main control module and a battery pack. The battery pack includes a plurality of battery modules. During the transition of mode switching, each of the battery modules outputs a constant current. The battery modules monitor the battery status of the battery modules respectively. Based on a load requirement, the battery status of the battery modules and a conversion efficiency, the main control module dynamically controls a voltage conversion operation mode of a voltage converter of the battery system and dynamically controls the operation modes of the battery modules respectively.

6 Claims, 4 Drawing Sheets

(56) References Cited

U.S. PATENT DOCUMENTS

| | | | |
|---|---|---|---|
| 8,470,464 B2 | 6/2013 | Troutman | |
| 8,576,589 B2* | 11/2013 | Melanson | H02J 7/0054 |
| | | | 323/207 |
| 8,816,613 B2 | 8/2014 | Lee | |
| 8,823,325 B2 | 9/2014 | Ling et al. | |
| 8,965,722 B2 | 2/2015 | Yoshida et al. | |
| 9,099,271 B2 | 8/2015 | Constantin et al. | |
| 2008/0180061 A1 | 7/2008 | Koski et al. | |
| 2010/0060231 A1* | 3/2010 | Trainor | H01G 11/14 |
| | | | 320/103 |
| 2011/0285345 A1* | 11/2011 | Kawai | B60L 11/1825 |
| | | | 320/107 |
| 2012/0319658 A1 | 12/2012 | White et al. | |
| 2013/0127423 A1 | 5/2013 | Liang et al. | |
| 2013/0179103 A1 | 7/2013 | Luo et al. | |
| 2014/0042977 A1 | 2/2014 | Kim | |
| 2014/0157034 A1 | 6/2014 | Chiueh et al. | |
| 2014/0184168 A1 | 7/2014 | Park | |
| 2014/0281591 A1* | 9/2014 | Uan-Zo-Li | G06F 1/263 |
| | | | 713/300 |
| 2014/0320067 A1 | 10/2014 | Ling et al. | |
| 2014/0354213 A1* | 12/2014 | Rivera-Poventud | |
| | | | H02J 7/0068 |
| | | | 320/107 |
| 2015/0008886 A1 | 1/2015 | Kim | |
| 2015/0022160 A1 | 1/2015 | Greening et al. | |
| 2015/0048853 A1 | 2/2015 | Gong et al. | |
| 2015/0244341 A1* | 8/2015 | Ritter | H01F 38/14 |
| | | | 307/104 |
| 2016/0118789 A1* | 4/2016 | Fornage | H02J 3/00 |
| | | | 307/52 |
| 2017/0005497 A1* | 1/2017 | Sherstyuk | H02J 7/0068 |
| 2017/0005503 A1* | 1/2017 | Kogler | H02J 7/007 |

FOREIGN PATENT DOCUMENTS

| | | |
|---|---|---|
| CN | 102934316 A | 2/2013 |
| TW | 200849766 A | 12/2008 |
| TW | 200913433 A | 3/2009 |
| TW | 201213178 A | 4/2012 |
| TW | I492480 B | 7/2015 |
| WO | WO-2014143444 A1 | 9/2014 |

OTHER PUBLICATIONS

H. Visairo et al., "A Reconfigurable Battery Pack for Improving Power Conversion Efficiency in Portable Devices", Proceedings of the 7th International Caribbean Conference on Devices, Circuits and Systems, Mexico, Apr. 28-30, 2008, pp. 1-6.

Ye Zhao et al., "Reconfigurable Solar Photovoltaic Battery Charger Using a Switch Matrix", 2012 IEEE 34th International Telecommunications Energy Conference (INTELEC), Sep. 30-Oct. 4, 2012, pp. 1-7.

Chin-Long Wey et al., "A Unitized Charging and Discharging Smart Battery Management System", 2013 International Conference on Connected Vehicles and Expo (ICCVE), Dec. 2-6, 2013, pp. 903-909.

Mohamed Daowd et al., "Passive and Active Battery Balancing comparison based on MATLAB Simulation", 2011 IEEE Vehicle Power and Propulsion Conference (VPPC), Sep. 6-9, 2011, pp. 1-7.

Jian Cao et al., "Battery Balancing Methods: A Comprehensive Review", IEEE Vehicle Power and Propulsion Conference (VPPC), Sep. 3-5, 2008, Harbin, China, pp. 1-6.

Wei Jiang et al., "Active Current Sharing and Source Management in Fuel Cell-Battery Hybrid Power System", IEEE Transactions on Industrial Electronics, Vol. 57, No. 2, Feb. 2010, pp. 752-761.

Taiwanese Office Action dated Jun. 15, 2016.

* cited by examiner

BATTERY SYSTEM AND CONTROL METHOD THEREOF

This application claims the benefit of Taiwan application Serial No. 104136913, filed Nov. 9, 2015, the present disclosure of which is incorporated by reference herein in its entirety.

TECHNICAL FIELD

The disclosure relates in general to a battery system and a control method thereof.

BACKGROUND

The power system which is powered by a chargeable battery and the electricity storage system which stores electric energy in a chargeable battery have high requirements on battery consistency and battery lifecycle. The power system and the electricity storage system basically have following requirements: (1) high battery consistency, (2) with limited divergence increasing of batteries after long time operation (such as 8-20 years), (3) preference of battery having high battery capacity for lengthening battery lifecycle, and (4) reducing voltage loss which comes from converting a single input voltage into multiple output voltages.

To meet requirement (1), battery cells are graded to select high quality battery, but the system cost will increase. As for requirement (2), by current technology, it is not easy to meet requirement (2) because the battery divergence is worse after long usage. As for requirement (3), the aged batteries still may have 70% residual battery capacity, but such aged batteries may be replaced for the sake of security. As for requirement (4), currently most systems are suffered by this problem which is not easily to be addressed.

Therefore, a battery system and a control method thereof are needed.

SUMMARY

The disclosure is directed to a battery system and a control method thereof. The battery modules used in the battery system have an enable mode and a bypass mode. Whether each of the battery modules is enabled or not is determined according to load characteristics.

The disclosure is directed to a battery system and a control method thereof. The battery modules used in the battery system have a constant-current output characteristic. No matter in the enable mode, in the bypass mode or during the transition of mode switching, each of the battery modules outputs a constant current.

According to one embodiment, a battery system including a main control module and a battery pack is provided. The battery pack is coupled to the main control module and a voltage converter. The battery pack includes a plurality of battery modules. During the transition of mode switching, each of the plurality of battery modules outputs a constant current. The plurality of battery modules monitor the battery status of each of the plurality of battery modules. The main control module dynamically controls a voltage conversion operation mode of the voltage converter of the battery system and dynamically controls the operation modes of each of the plurality of battery modules according to a load requirement, the battery status of each of the plurality of battery modules and a conversion efficiency.

According to another embodiment, a control method of the battery system is provided. The battery status of a plurality of battery modules of the battery system is monitored. A voltage conversion operation mode of the battery system is dynamically controlled and the operation modes of each of the plurality of battery modules is also dynamically controlled according to a load requirement, the battery status of each of the plurality of battery modules and a conversion efficiency. During the transition of mode switching, each of the plurality of battery modules outputs a constant current.

The above and other contents of the disclosure will become better understood with regard to the following detailed description of the preferred but non-limiting embodiment(s). The following description is made with reference to the accompanying drawings.

Figure 1:
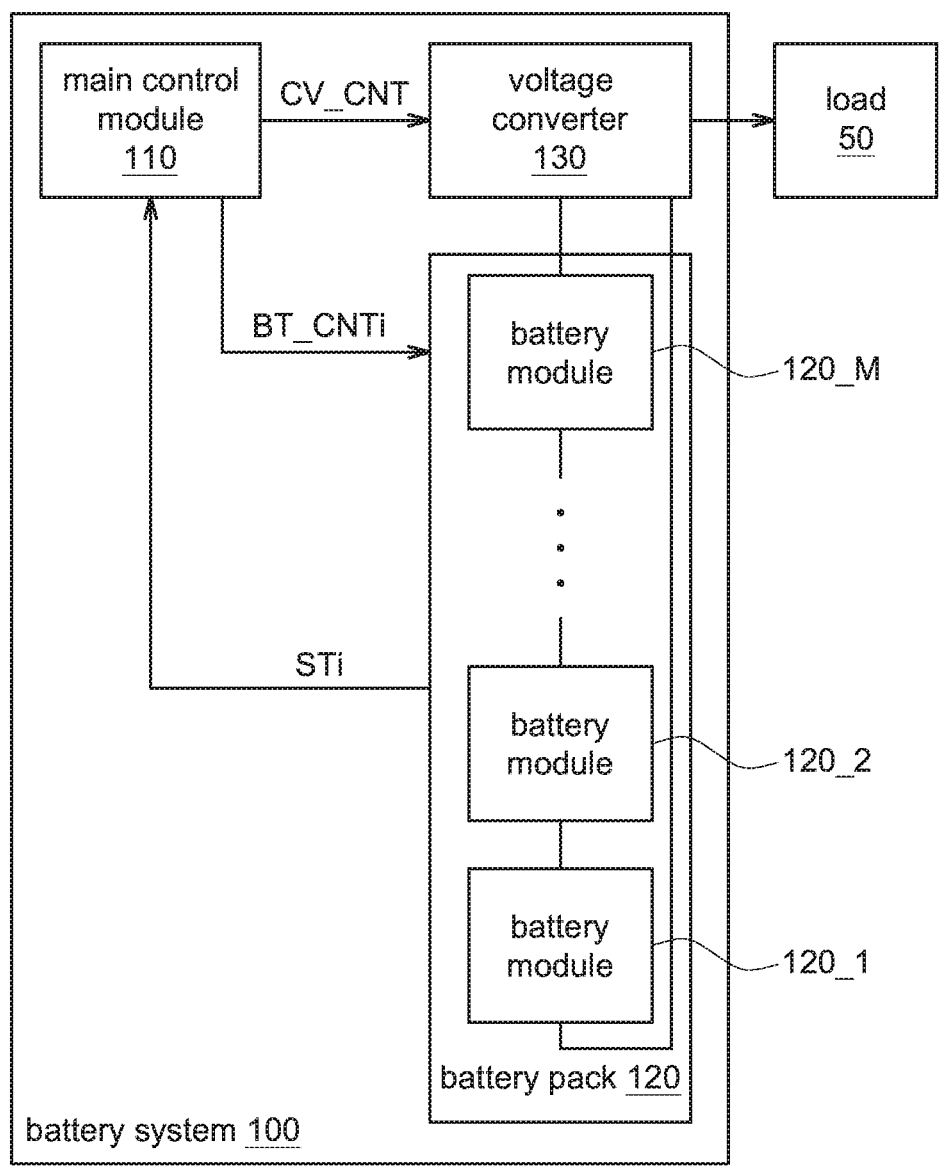
FIG. 1 shows a functional block diagram of a battery system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 a functional block diagram of a battery system according to an embodiment of the present disclosure. As indicated in FIG. 1, the battery system 100 includes a main control module 110, a battery pack 120 and a voltage converter 130. The battery system 100 outputs power to a load 50.

The battery pack 120 is coupled to the main control module 110 and the voltage converter 130. The battery pack 120 includes a plurality of series-connected battery modules 120_1, 120_2, . . . , 120_M, wherein M is a positive integer. The battery modules 120_1, 120_2, . . . , 120_M of the battery pack 120 monitor their own battery status and output the battery status signals STi (i=1-M) to the main control module 110 respectively.

The main control module 110 generates a converter control signal CV_CNT and battery control signals BT_CNTi according to the conversion efficiency of the voltage converter 130, the battery status signals STi outputted from the battery pack 120, and a load requirement (such as load voltage requirement and/or load current requirement). In the embodiment of the disclosure, the main control module 110 may be implemented by hardware or software.

The voltage conversion operation mode of the voltage converter 130 is determined according to the converter control signal CV_CNT outputted from the main control module 110. Exemplarily but not restrictively, the voltage converter 130 may be realized by such as a DC-DC converter.

Figure 2:
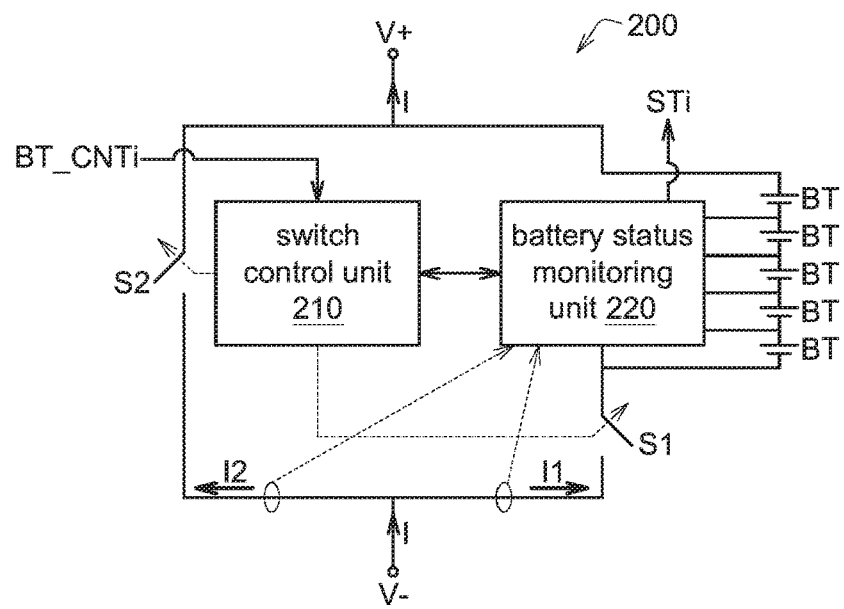
FIG. 2 shows a functional block diagram of a battery module according to an embodiment of the present disclosure.

The operation modes of the battery modules 120_1, 120_2, ..., 120_M of the battery pack 120 are determined according to the battery control signals BT_CNTi (i=1-M) outputted from the main control module 110 respectively. Referring to FIG. 2, a functional block diagram of a battery module according to an embodiment of the present disclosure is shown. As indicated in FIG. 2, the battery module 200 at least includes a switch control unit 210, a battery status monitoring unit 220, one or more batteries BT, and switches S1 and S2. The battery modules 120_1, 120_2, ..., 120_M of FIG. 1 may be implemented by the battery module 200. In FIG. 2, the batteries BT are connected in series. In some other possible embodiments of the present disclosure, the batteries BT may be connected in parallel or in a combination of series connection and parallel connection.

The switch control unit 210 is coupled to the main control module 110. The switch control unit 210 controls the switches S1 and S2 according to the battery control signal BT_CNTi outputted from the main control module 110.

The battery status monitoring unit 220 is coupled to the main control module 110 and the switch control unit 210. The battery status monitoring unit 220 monitors the status (such as the battery current, and/or the battery voltage and/or the battery capacity) of the batteries BT to generate and output the battery status signal STi to the main control module 110. Exemplarily but not restrictively, the battery status signal STi generated by the battery status monitoring unit 220 indicates the battery capacity of the battery module 200.

Besides, the battery status monitoring unit 220 also monitors current signals I1 and I2 to output to the switch control unit 210, which accordingly controls the switches S1 and S2 according to the received current signals I1 and I2.

The batteries BT is coupled to the battery status monitoring unit 220 and the voltage converter 130. The switches S1 and S2 are controlled by the switch control unit 210.

In short, the switch control unit 210 controls whether the switches S1 and S2 are in a short condition or in an open condition according to the battery control signal BT_CNTi outputted from the main control module 110, and controls the switching rates of the switches S1 and S2 according to the monitor results (the current signals I1 and I2) from the battery status monitoring unit 220.

In the embodiment, the battery module 200 has two operation modes, that is, an enable mode and a bypass mode. The batteries BT of the battery module 200 are allowed to output currents and voltages if the battery module 200 is in the enable mode but are not allowed to output currents or voltages if the battery module 200 is in the bypass mode.

In another exemplary embodiment of the disclosure, the main control module 110, the voltage converter 130 of the battery system 100 and the switch control unit 210, the battery status monitoring unit 220 of the battery modules 120_1~120_M can also be implemented by software programs or firmware programs, and are loaded into the processor to execute. The processor can be a device having a logic operating ability such as a central processing unit (CPU), a micro-processor or an embedded controller, which is not limited by the disclosure. The main control module 110, such as a processor, which may execute multiple program instructions for operation of control method of a battery system. The program instructions may be stored in non-transitory computer readable medium such as non-volatile memory and/or hard disk in advanced systems.

Figure 3:
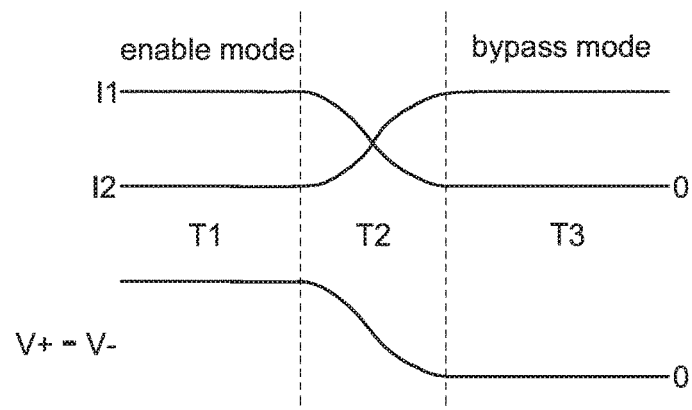
FIG. 3 shows operation modes of a battery module according to an embodiment of the present disclosure.

FIG. 3 shows operation modes of the battery module 200 according to an embodiment of the present disclosure. As indicated in FIG. 3, when the battery module 200 is in the enable mode (before time point T1), the current I1 on the first current path (including the batteries BT) has a current value I, and the current I2 on the other current path has a pre-determined value (such as I2=0). The sum of the currents I1 and I2 is a total current I (wherein I1=1, and I2=0). During the enable mode, the switch S1 is in the short condition, and the switch S2 is in the open condition.

If the battery control signal BT_CNTi received by the battery module 200 indicates that the battery module 200 is to be switched to the bypass mode from the enable mode, the battery module 200 will switch the mode within time period T2. During the transition of mode switching, the battery status monitoring unit 220 monitors the currents I1 and I2, and outputs the monitored results to the switch control unit 210, which gradually (i.e. step-by-step) disconnects the switch S1 (that is, gradually switches the switch S1 to the open condition from the short condition) and gradually conducts the switch S2 (that is, gradually switches the switch S2 to the short condition from the open condition). However, within time period T2, the sum of the currents I1 and I2 remains unchanged as the total current I (I1+I2=1). During the transition of mode switching, the battery module 200 switches from enable mode to bypass mode, the current I1 gradually decreases but the current I2 gradually increases. To be specific, the battery module 200 with seamless mode transition switch control unit 210 outputs a constant current during mode transition operations of switches S1 and S2 from enable mode to bypass mode or from bypass mode to enable mode.

After time point T3, the battery module 200 is in the bypass mode, the current I1 on the first current path decreases to 0 (that is, the switch S1 is in the open condition), but the current I2 on the second current path increases to the current I (that is, the switch S2 is in the short condition). In the bypass mode, the sum of the currents I1 and I2 still remains at the total current I (I1=0, I2=1).

In the embodiment of the disclosure, the battery module 200 has the function of constant current switch. That is, no matter the battery module 200 is in the enable mode or the bypass mode or during the transition of mode switching, the total current I outputted from the battery module 200 remains constant.

In the embodiment of the disclosure, the battery module 200 has the function of constant current switch and accordingly the operation of the system maintains stable. That is, if the battery module 200 does not have the function of constant current switch, the total current I outputted from the battery module 200 may vary during the transition of mode switching, and the total output current of the battery pack 200 may vary as well. If so, the operation of the system may be not stable.

FIG. 3 also shows the voltage across two terminals (V+, V−) of the battery module 200. The output voltage of the battery module 200 is stable when the battery module 200 is in the enable mode. The output voltage of the battery module 200 gradually decreases when the battery module 200 is during the transition of mode switching. The output voltage of the battery module 200 drops to 0 when the battery module 200 is in the bypass mode.

As indicated in FIG. 3, if the battery module 200 is in a discharge status, the value of the current I is positive; and if the battery module 200 is in a charge status, then the value of the current I is negative.

In the embodiment of the disclosure, exemplarily but not restrictively, the switches S1 and S2 may be implemented by metal-oxide-semiconductor field-effect transistor (MOSFET) or insulated gate bipolar transistor (IGBT).

Figure 4:
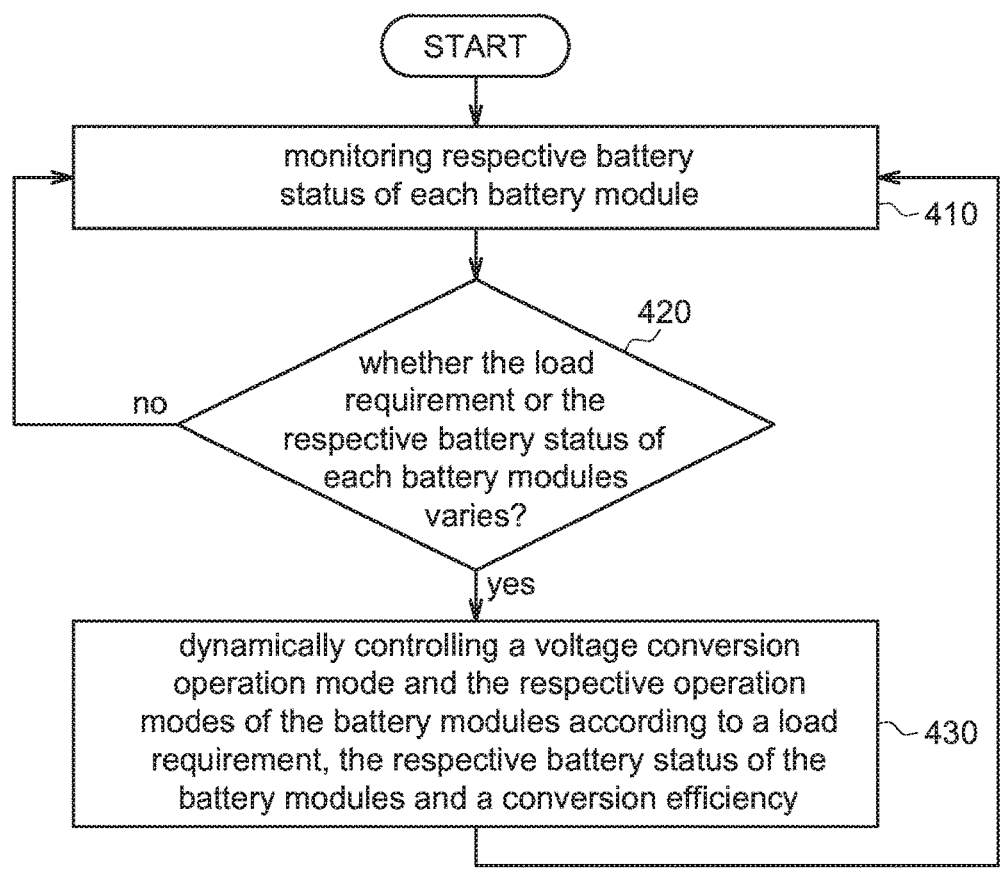
FIG. 4 shows a flowchart of a control method of a battery system according to an embodiment of the present disclosure.

Referring to FIG. 4, a flowchart of a control method of a battery system according to an embodiment of the present disclosure is shown. In step 410, the main control module 110 monitors battery status of each of the battery modules 120_1~120_M of the battery pack 120 respectively.

In step 420, the main control module 110 determines whether the load requirement varies or whether the battery status of each of the battery modules 120_1~120_M of the battery pack 120 varies. The main control module 110 may receive the load requirement of the battery system 100 or predict the required load requirement of the battery system 100. If neither the load requirement nor the battery status of each of the battery modules 120_1~120_M of the battery pack 120 varies respectively, the method returns to step 410. If one or both of the load requirement and the battery status of each of the battery modules 120_1~120_M of the battery pack 120 varies respectively, then the method proceeds to step 430.

In step 430, the main control module 110 dynamically controls a voltage conversion operation mode of the voltage converter 130 and dynamically controls the operation modes of the battery modules 120_1~120_M according to the load requirement, the battery status of the battery modules 120_1~120_M and a conversion efficiency respectively. The details of the step 430 are disclosed below. The main control module 110 dynamically determines whether each of the battery modules 120_1~120_M is in the enable mode or the bypass mode. In the embodiment of the disclosure, the operation status of each battery module is independent, and each of the battery modules 120_1~120_M outputs a constant current during the transition of mode switching.

Figure 5:
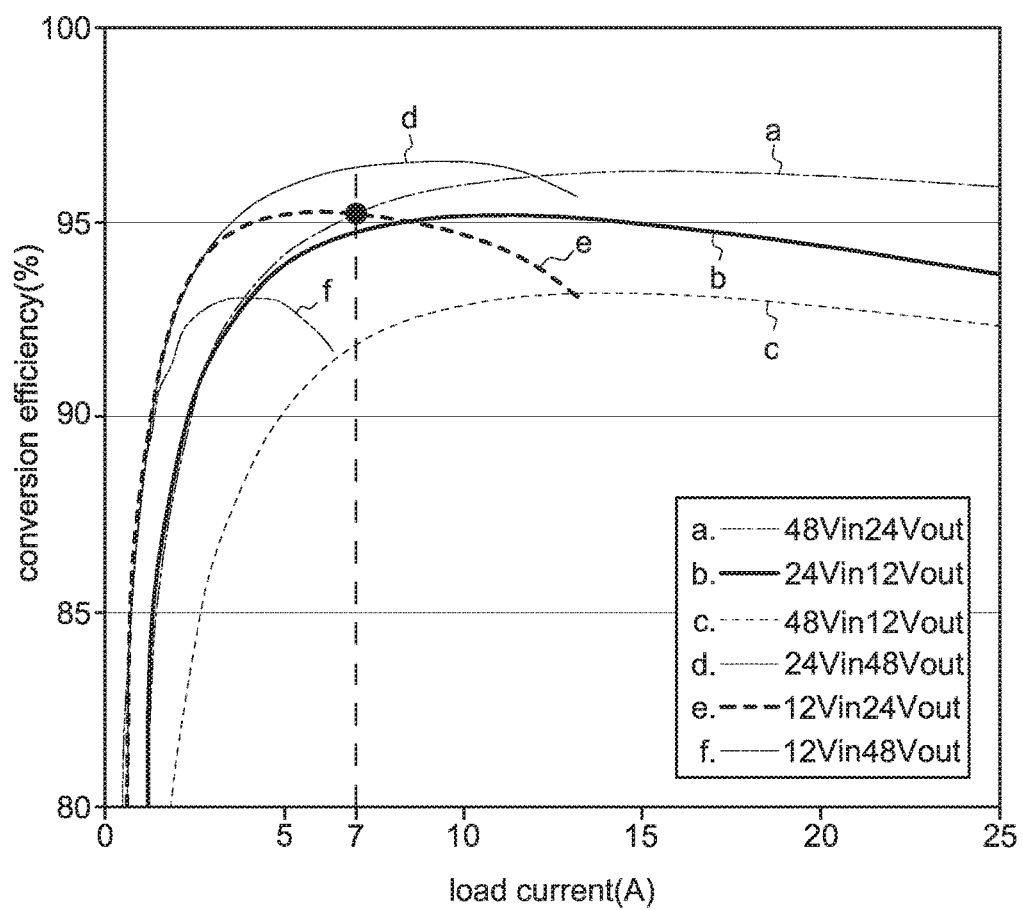
FIG. 5 shows conversion efficiency curves of a voltage converter according to an embodiment of the present disclosure.

The control of the voltage conversion operation mode of the voltage converter 130 is disclosed below. FIG. 5 shows conversion efficiency curves of the voltage converter 130 according to an embodiment of the present disclosure. In FIG. 5, suppose the voltage converter 130 has 6 conversion efficiencies respectively represented by curves "a" ~"f". The curve "a" refers that the voltage converter 130 converts 48V input voltage (48Vin) into 24V output voltage (24Vout). The curve "b" refers that the voltage converter 130 converts 24V input voltage (24Vin) into 12V output voltage (12Vout). The curve "c" refers that the voltage converter 130 converts 48V input voltage (48Vin) into 12V output voltage (12Vout). The curve "d" refers that the voltage converter 130 converts 24V input voltage (24Vin) into 48V output voltage (48Vout). The curve "e" refers that the voltage converter 130 converts 12V input voltage (12Vin) into 24V output voltage (24Vout). The curve "f" refers that the voltage converter 130 converts 12V input voltage (12Vin) into 48V output voltage (48Vout). That is, the curves "a", "b" and "c" indicate that the voltage converter 130 is in a buck mode; and the curves "d", "e" and "f" indicate that the voltage converter 130 is in a boost mode. From FIG. 1, the input voltage of the voltage converter 130 is provided by the battery pack 120.

If the load requirement is 24V (i.e. the voltage converter 130 provides 24V output voltage to the load 50), then the conversion efficiency of the voltage converter 130 selects one from the curves "a" and "e". The main control module 110 controls the voltage conversion operation mode of the voltage converter 130 to select one from the conversion efficiency curves "a" and "e" according to the load current requirement. If the load current requirement is smaller than 7 A, as indicated in FIG. 5, the conversion efficiency curve "e" provides better conversion efficiency. Under such circumstance, the main control module 110 controls the voltage converter 130 to operate in the conversion efficiency curve "e". Conversely, if the load current requirement is larger than 7 A, as indicated in FIG. 5, the conversion efficiency curve "a" provides better conversion efficiency. Under such circumstance, the main control module 110 controls the voltage converter 130 to operate in the conversion efficiency curve "a".

Likewise, if the load requirement is 48V (i.e. the voltage converter 130 provides 48V output voltage to the load 50), then the conversion efficiency of the voltage converter 130 selects one from the curves "d" and "f". The main control module 110 controls the voltage conversion operation mode of the voltage converter 130 to select one from the conversion efficiency curves "d" and "f" according to the load current requirement. As indicated in FIG. 5, no matter what the load requirement is, the conversion efficiency curve "d" provides better conversion efficiency, so the main control module 110 controls the voltage converter 130 to operate in the conversion efficiency curve "d".

If the load requirement is 12V (i.e. the voltage converter 130 provides 12V output voltage to the load 50), then the conversion efficiency of the voltage converter 130 selects one from the curves "b" and "c". The main control module 110 controls the voltage conversion operation mode of the voltage converter 130 to select one from the conversion efficiency curves "b" and "c" according to the load current requirement. As indicated in FIG. 5, no matter what the load current requirement is, the conversion efficiency curve "b" provides better conversion efficiency, so the main control module 110 controls the voltage converter 130 to operate in the conversion efficiency curve "b".

In the embodiment of the disclosure, the conversion efficiency curves "a"~"f" of the voltage converter 130 are inputted to the main control module 110 in advance. Or, the main control module 110 has learning function, and learns the conversion efficiency curve from the conversion efficiency of the voltage converter 130 even when the main control module 110 does not receive the conversion efficiency curve of the voltage converter 130 in advance.

In the embodiment of the disclosure, the main control module 110 may test the characteristics of the voltage converter 130. The voltage converter 130 may obtain different conversion efficiencies according to the conversion ratio, the boost/buck mode and the output power.

In the embodiment of the disclosure, the main control module 110 determines output voltage of the voltage converter 130 according to the load voltage requirement. According to the load power requirement (the load voltage requirement and/or the load current requirement), the main control module 110 may determine the boost/buck mode of the voltage converter 130, and determine the input voltage of the voltage converter 130. The main control module 110 may determine whether each of the battery modules 120_1~120_M of the battery pack 120 is in the enable mode or the bypass mode according to the determined input voltage of the voltage converter 130. In short, if the battery system 100 has a plurality of different conversion efficiencies, the battery system 100 selects one of the conversion efficiencies and determines the total output voltage of each of the battery modules 120_1~120_M according to the load voltage requirement and the load current requirement of the battery system 100, and further determines the operation mode of each of the battery modules 120_1~120_M according to the determined total output voltage of each of the battery modules 120_1~120_M and the battery capacity of each of the battery modules 120_1~120_M. The embodiment of the disclosure uniformly consumes the battery capacity of the battery modules 120_1~120_M. That is, if possible, the battery module having a lower remaining battery capacity is in the bypass mode, and the battery module having a higher remaining battery capacity is in the enable mode. Thus, the power consumption of the battery modules of the battery pack will be balanced.

Exemplarily but not restrictively, suppose the battery pack 120 includes 16 series-connected battery modules 120_1~120_16, wherein each of the battery modules 120_1~120_16 outputs 3V of voltage. The control of the operation modes of each battery module 120_1~120_16 is disclosed below.

If the voltage converter 130 operates in the conversion efficiency curves "a" or "c" of FIG. 5 (the voltage converter 130 receives 48V input voltage, that is, the battery pack 120 provides 48V output voltage), all the 16 battery modules 120_1~120_16 are selected to be in the enable mode to output 3*16=48V output voltage to the voltage converter 130.

If the voltage converter 130 operates in the conversion efficiency curves "b" or "d" of FIG. 5 (the voltage converter 130 receives 24V input voltage, that is, the battery pack 120 provides 24V output voltage), 8 of the 16 battery modules 120_1~120_16 are in the enable mode and the other 8 battery modules are in the bypass mode. Thus, 3*8=24V output voltage is outputted to the voltage converter 130. In the embodiment of the disclosure, the 8 battery modules with higher battery capacity are selected to be in the enable mode, and the 8 battery modules with lower battery capacity are selected to be in the bypass mode.

If the voltage converter 130 operates in the conversion efficiency curves "e" and "f" of FIG. 5 (the voltage converter 130 receives 12V input voltage, that is, the battery pack 120 provides 12V output voltage), among the 16 battery modules 120_1~120_16, 4 battery modules are selected to be in the enable mode and the other 12 battery modules are selected to be in the bypass mode. Thus, 3*4=12V output voltage is outputted to the voltage converter 130. In the embodiment of the disclosure, the 4 battery modules with higher battery capacity are selected to be in the enable mode, and the 12 battery modules with lower battery capacity are selected to be in the bypass mode.

In the embodiment of the disclosure, the main control module 110 dynamically determines and/or controls and/or changes operation modes of the battery modules according to the battery capacity of the battery modules.

For example, in the same cycle, the 4 battery modules with higher battery capacity are in the enable mode, and the 12 battery modules with lower battery capacity are in the bypass mode. Suppose the battery modules 120_1, 120_3, 120_7 and 120_10 have higher battery capacity, the battery modules 120_1 has the lowest battery capacity among the battery modules 120_1, 120_3, 120_7 and 120_10, and the remaining battery modules have a battery capacity lower than that of the battery modules 120_1, 120_3, 120_7 and 120_10. Therefore, in the current cycle, the battery modules 120_1, 120_3, 120_7 and 120_10 are selected to be operated in the enable mode, and the remaining battery modules are selected to be operated in the bypass mode. In the next cycle, the main control module 110 finds that the battery capacity of the battery modules 120_1 is lower than that of the battery modules 120_5 this is because in the previous cycle, the battery module 120_1 is discharged, hence the battery capacity of the battery module 120_1 is lowered. Therefore, in the next cycle, the main control module 110 controls the battery modules 120_5 (along with the battery modules 120_3, 120_7 and 120_10) to be operated in the enable mode, and controls the battery modules 120_1 along with other battery module to be operated in the bypass mode.

In the embodiments of the present disclosure, via dynamic monitoring, the power consumption of the battery modules may be effectively balanced, hence avoiding the situation that only some of the battery modules are selected to provide power but some other battery modules are not selected to provide power.

In the above disclosure, the example that one of the battery modules switches mode within the same cycle, but the present disclosure is not limited thereto. Within the same cycle, none or more than one battery module may be controlled to switch the operation mode(s), which is still within the spirit of the present disclosure.

In the embodiment of the disclosure, the voltage conversion efficiency of the voltage converter 130 may be raised by dynamically controlling the voltage conversion operation mode of the voltage converter 130.

In the embodiment of the disclosure, even if the battery capacity of the batteries of the battery modules decreases because of aging, these aged batteries may be selected to provide output power. Therefore, the battery system of the embodiments of the present disclosure has high tolerance in battery divergence. That is, the battery system of the embodiments of the present disclosure may adopt lower quality or lower capacity batteries. Thus, the battery system of the embodiments of the present disclosure has lower requirements on battery quality, which may bring down the cost of the battery system.

It will be apparent to those skilled in the art that various modifications and variations can be made to the disclosed embodiments. It is intended that the specification and examples be considered as exemplary only, with a true scope of the present disclosure being indicated by the following claims and their equivalents.

What is claimed is:

1. A control method for a battery system, comprising:
monitoring the battery status of a plurality of battery modules of the battery system, each of the plurality of the battery modules including a plurality of switches; and
dynamically controlling a voltage conversion operation mode of the battery system and dynamically controlling the operation modes of each of the plurality of battery modules according to a load requirement, the battery status of each of the plurality of battery modules and a conversion efficiency;
wherein during a transition of mode switching, each of the plurality of battery modules outputs a constant current;
each of the plurality of battery modules has an enable mode and a bypass mode; and
when a battery module of the plurality of battery modules is in the enable mode, a first current is on a first current path comprising the battery module, a second current on a second current path has a pre-determined value, a sum of the first and the second currents is a total current, a first switch of the plurality of switches is in a short condition, and a second switch of the plurality of switches is in an open condition.

2. The control method according to claim 1, further comprising:
monitoring a plurality of current signals of each of the plurality of battery modules by the plurality of battery modules to control switching rates of the plurality of switches of each of the plurality of battery modules.

3. The control method according to claim 1, further comprising:
determining the load requirement or determining the battery status of each of the plurality of battery modules; and
dynamically controlling the voltage conversion operation mode of the battery system and the operation modes of each of the plurality of battery modules according to the load requirement, the battery status of each of the plurality of battery modules and the conversion efficiency if the load requirement varies or if the battery status of each of the plurality of battery modules varies.

4. The control method according to claim 1, wherein
when the battery module of the plurality of battery modules is during the transition of mode switching, the battery status monitoring unit monitors the first current and the second current and outputs to a switch control unit, which disconnects the first switch step-by-step and conducts the second switch step-by-step, and
when the battery module of the plurality of battery modules is during the transition of mode switching, the sum of the first current and the second current is still the total current; and during the transition of mode switching, the first current decreases, and the second current increases.

5. The control method according to claim 1, wherein
when the battery module of the plurality of battery modules is in the bypass mode, the first switch is in the open condition to decrease the first current to the pre-determined value, and the second switch is completely in the short condition to increase to the total current.

6. The control method according to claim 1, wherein
if the battery system has a plurality of different conversion efficiencies, one conversion efficiency among the conversion efficiencies is selected and a total output voltage of the plurality of battery modules is determined according to a load voltage requirement and a load current requirement of the battery system, and the operation modes of each of the plurality of battery modules are determined according to the total output voltage of each of the plurality of battery modules and the battery capacities of the battery modules.

* * * * *